US009363064B2

(12) United States Patent
Gao et al.

(10) Patent No.: US 9,363,064 B2
(45) Date of Patent: Jun. 7, 2016

(54) COMP TRANSMISSION FEEDBACK METHOD, DEVICE AND SYSTEM (71) Applicant: China Academy of Telecommunications Technology, Beijing (CN)

(72) Inventors: Qiubin Gao, Beijing (CN); Ranran Zhang, Beijing (CN); Hao Ni, Beijing (CN); Ying Peng, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 5 days.

(21) Appl. No.: 14/407,464

(22) PCT Filed: Jun. 9, 2013

(86) PCT No.: PCT/CN2013/077068
§ 371 (c)(1),
(2) Date: Dec. 11, 2014

(87) PCT Pub. No.: WO2013/185590
PCT Pub. Date: Dec. 19, 2013

(65) Prior Publication Data
US 2015/0155999 A1 Jun. 4, 2015

(30) Foreign Application Priority Data
Jun. 11, 2012 (CN) .......................... 2012 1 0192004
Oct. 11, 2012 (CN) .......................... 2012 1 0384490

(51) Int. Cl.
H04L 5/00 (2006.01)
H04L 1/00 (2006.01)
(Continued)

(52) U.S. Cl.
CPC .............. *H04L 5/0057* (2013.01); *H04B 7/024* (2013.01); *H04B 7/0417* (2013.01);
(Continued)

(58) Field of Classification Search
CPC ...... H04B 7/066; H04B 7/063; H04B 7/0636; H04B 7/0621; H04B 7/0486; H04B 7/0417; H04L 5/00; H04L 5/0053; H04L 5/0048; H04L 5/0035; H04L 5/0057; H04L 72/085; H04L 43/06
USPC .................................. 370/252, 328, 329, 331
See application file for complete search history.

(56) References Cited

U.S. PATENT DOCUMENTS

2011/0103287 A1* 5/2011 Ma ........................ H04B 7/024
370/312
2012/0287799 A1* 11/2012 Chen ...................... H04B 7/024
370/252

(Continued)

FOREIGN PATENT DOCUMENTS

CN 101873670 A 10/2010
CN 101998327 A 3/2011

(Continued)

OTHER PUBLICATIONS

Ericsson et al. "RI and PMI sharing between multiple CSI processes", 3GPP Draft R1-122836, May 12, 2012.*

(Continued)

*Primary Examiner* — Afsar M Qureshi
(74) *Attorney, Agent, or Firm* — Kilpatrick Townsend & Stockton LLP (57) ABSTRACT

The present invention relates to the field of communications. Disclosed are a CoMP transmission feedback method, device and system, the method comprising: determining an inter-mode reference relationship between at least two configured modes according to configuration information transmitted by a base station (s101); at each feedback instance. determining the parameter in the current mode via the parameter in a reference mode and according to the reference relationship between modes (s102); and feeding back the channel state information containing the parameter in the current mode according to the configuration of the current mode (s103). The present invention realizes the sharing of pre-coding matrix indicator/rank indicator (PMI/RI) information among a plurality of channel quality indicators (CQIs) having different interference assumptions, and realizes the sharing of RI information among different transmission points, thus achieving a dependency relationship among a plurality of feedback modes.

17 Claims, 5 Drawing Sheets

(51) Int. Cl.
*H04B 7/04* (2006.01)
*H04B 17/309* (2015.01)
*H04B 7/02* (2006.01)
*H04B 7/06* (2006.01)

(52) U.S. Cl.
CPC ............. *H04B 7/0486* (2013.01); *H04B 7/063* (2013.01); *H04B 7/066* (2013.01); *H04B 7/0619* (2013.01); *H04B 7/0632* (2013.01); *H04B 7/0639* (2013.01); *H04B 17/309* (2015.01); *H04L 1/0026* (2013.01); *H04L 1/0029* (2013.01); *H04L 5/0035* (2013.01); *H04L 5/0048* (2013.01); *H04L 5/0053* (2013.01)

(56) References Cited

U.S. PATENT DOCUMENTS

| | | | | |
|---|---|---|---|---|
| 2013/0102304 A1* | 4/2013 | Lee | ........................ | H04W 24/00 455/422.1 |
| 2013/0258886 A1* | 10/2013 | Chen | ..................... | H04B 7/0417 370/252 |
| 2013/0336214 A1* | 12/2013 | Sayana | .................. | H04B 7/024 370/328 |
| 2013/0343299 A1* | 12/2013 | Sayana | ................. | H04B 7/0417 370/329 |
| 2014/0376485 A1* | 12/2014 | Lee | ........................ | H04B 7/024 370/329 |

FOREIGN PATENT DOCUMENTS

| | | |
|---|---|---|
| CN | 102237969 A | 11/2011 |
| CN | 102480756 A | 5/2012 |
| JP | 2013055152 A1 | 4/2013 |
| JP | 2014-530580 A | 11/2014 |

OTHER PUBLICATIONS

An Office Action issued on Nov. 30, 2015 in the JP counterpart application (2015-516421).
An Extended European Search Report issued on Jul. 24, 2015 in the EP counterpart application (13805169.3).
Ericsson et al. "RI and PMI sharing between multiple CSI processes", 3GPP Draft; R1-122836, 3rd Generation Partnership Project (3GPP), Mobile Competence Centre ; 650, Route Des Lucioles ; F-06921 Sophia-Antipolis Cedex ; France, vol. RAN WG1, no. Prague, Czech Republic; 20120521-20120530, May 12, 2012, XP050601012, [retrieved on May 12, 2012].
International Search Report for PCT/CN2013/077068.

* cited by examiner

Fig.1

T1: RI report     T2: Wideband PMI/CQI report

Fig.2

T1: RI report    T2: Wideband PMI/CQI report    T4: Sub-band CQI report

Fig.3

T1: RI report    T2: Wideband PMI/CQI report    T3: Wideband CQI report

Fig.4

T1: RI report    T2: Wideband PMI/CQI report    T3: Wideband CQI report    T4: Sub-band CQI report

Fig.5

T1: RI report    T2: Wideband PMI/CQI report    T3: Wideband CQI report    No report

Fig.6

T1: RI report    T2: Wideband PMI/CQI report    T3: Wideband CQI report    No report

Fig.7

| Configuration information is transmitted to a user equipment, where the configuration information includes a process reference relationship between at least two configured processes | S801 |

| Channel state information fed back by the user equipment for each feedback in the current process is received | S802 |

| The channel state information is determined from the parameters fed back in the current process or from the parameters fed back in the current process and the parameters fed back in the reference process of the current process | S803 |

COMP TRANSMISSION FEEDBACK METHOD, DEVICE AND SYSTEM

The present application is a US National Stage of International Application No. PCT/CN2013/077068, filed Jun. 9, 2013, designating the United States, and claiming the benefits of Chinese Patent Applications No. 201210192004.5, filed with the Chinese Patent Office on Jun. 11, 2012 and entitled "Feedback method of and apparatus and system for coordinated multi-point transmission/reception", and No. 201210384490.0, filed with the Chinese Patent Office on Oct. 11, 2012 and entitled "Feedback method of and apparatus and system for coordinated multi-point transmission/reception", both of which are hereby incorporated by reference in their entireties.

FIELD

The present invention relates to the field of communications and particularly to a feedback method of and apparatus and system for coordinated multi-point transmission/reception.

BACKGROUND

The use of network deployment at the same frequency in a Long Term Evolution-Advanced (LTE-A) system has significantly improved the utilization ratio of spectrums but may cause a signal of a user at the edge of a cell to be seriously faded and also subjected to high interference from another cell, and an experience of the user at the edge may be seriously degraded if the issues of signal fading and interference fail to be handled.

With the technology of Coordinated Multi-Point transmission/reception (CoMP), information exchanges and joint transmission between multiple cells have been introduced so that the quality of the signal can be improved and also inter-cell interference can be lowered to thereby significantly improve the performance of data transmission for the user at the edge of the cell.

Existing general coordinated multi-point transmission schemes can fall into four categories: Dynamic Point Selection (DPS), Dynamic Point Blanking (DPB), Coordinated Scheduling/Beam-forming (CS/CB) and Joint Transmission (JT). In a practical application, there can be a hybrid scheme of the four transmission schemes. For example, DPS and CS/CB are combined so that a primary transmission point is selected dynamically and cooperating transmission points other than the primary transmission point are scheduled jointly for coordinated beam-forming, etc. In a real system, there may be multiple transmission schemes in a transmission mode to support dynamic switching between the various transmission schemes. In order to better guarantee the performance of transmission and the stability of the system, switching to transmission by a single point tends to be supported in a transmission mode supporting CoMP transmission.

Different Channel State Information-Reference Signals (CSI-RSs) or Cell-specific Reference Signals (CRSs) are configured in the system so that a User Equipment (UE) (or referred to as a user terminal) can measure downlink channels of the respective transmission points. Notably the transmission points each may not be a physical transmission point but may be a virtual transmission point, where each virtual transmission point corresponds to a CSI-RS resource, and each virtual transmission point is consisted of one or more physical transmission points.

Information are calculated according to Channel State Information (CSI) required for the transmission schemes and fed back after the downlink channels are measured. The various transmission schemes need to be supported by the corresponding channel state information. For example, the channel state information of the multiple transmission points or the channel state information of some transmission point and indication information corresponding to the transmission point needs to be fed back in the DPS transmission scheme, channel quality information under respective interference assumptions needs to be fed back when DPB is combined with DPS transmission scheme, and the CSI with the same rank needs to be fed back by the multiple transmission points in the JT transmission scheme, etc. A measurement set refers to a set of transmission points for the channel state information to be measured by the UE, or to a set of reference signal resources, each of which represents one or more transmission points, and then taking the measurement set including two Transmission Points (TPs) as an example, the channel state information required for the respective transmission schemes is as depicted in Table 1:

TABLE 1

| Channel state information | | | | |
|---|---|---|---|---|
| | Transmitted signal assumption | | Interference assumption | |
| | TP1 | TP2 | TP1 | TP2 |
| $CQI_1$ | $RI_1/PMI_1$ | — | Off | On |
| $CQI_2$ | $RI_2/PMI_2$ | — | Off | Off |
| $CQI_3$ | — | $RI_3/PMI_3$ | On | Off |
| $CQI_4$ | — | $RI_4/PMI_4$ | Off | Off |
| $CQI_5$ | $RI_5/PMI_5$ | $RI_5/PMI_6$ | Off | Off |

Where the $CQI_1$ (the CQI stands for Channel Quality Indicator) is calculated assuming that a signal is transmitted from the TP1, and a Pre-coding Matrix Indicator (PMI) and a Rank Indicator (RI) of the signal transmission are the $RI_1/PMI_1$ calculated from a channel from the TP1 to the UE, and the signal may be subjected to interference from a signal transmitted by the TP2 to another user;

The $CQI_2$ is calculated assuming that a signal is transmitted from the TP1, and a PMI and an RI of the transmitted signal are the $RI_2/PMI_2$ calculated from the channel from the TP1 to the UE, and no user will be scheduled by the TP2 on the corresponding resource, so the signal will not be subjected to interference from the TP2;

The $CQI_3$ is calculated assuming that a signal is transmitted from the TP2, and a PMI and an RI of the transmitted signal are the $RI_3/PMI_3$ calculated from a channel from the TP2 to the UE, and the signal may be subjected to interference from a signal transmitted by the TP1 to another user;

The $CQI_4$ is calculated assuming that a signal is transmitted from the TP2, and a PMI and an RI of the transmitted signal are the $RI_4/PMI_4$ calculated from the channel from the TP2 to the UE, and no user will be scheduled by the TP1 on the corresponding resource, so the signal will not be subjected to interference from the TP1;

The $CQI_5$ is calculated assuming that signals are transmitted from both the TP1 and the TP2, and PMIs and RIs of the transmitted signal of the TP1 are the $RI_5/PMI_5$ and the $RI_6/PMI_6$ calculated from the channel from the TP2 to the UE, and both the TP1 and the TP2 transmit data to the UE, so neither of them will cause interference.

Both the $CQI_1/RI_2/PMI_1$ and the $CQI_2/RI_2/PMI_2$ are calculated assuming that the signals are transmitted from the TP1 except that there is interference or no interference to the UE from the TP2, which correspond to two different interference assumptions. In this case, it can be assumed that $RI_1=RI_2$ and $PMI_1=PMI_2$ so that the UE only needs to feed back the $CQI_1/RI_1/PMI_1$ and the $CQI_2$, thus saving an overhead of feeding back the $RI_2/PMI_2$. Alike it can be assumed that $RI_3=RI_4$ and $PMI_3=PMI_4$, thus saving an overhead of feeding back the $RI_4/PMI_4$. Furthermore it can be assumed that $RI_5=RI_1$; $PMI_5=PMI_1$; $RI_6=RI_3$; and $PMI_6=PMI_3$. Moreover the $CQI_5$ is for the purpose of supporting JT transmission where two transmission points are required to transmit the same number of data layers, i.e., $RI_5=RI_6$. In order to perform the function above, it is necessary to introduce the interdependency between the reported various channel information of the respective transmission points.

In order to support dynamic switching between the various CoMP transmission schemes, the UE needs to feed back channel information of one or more transmission points including one or more CQUPMURI values under different interference assumptions. There are two existing practices to feed back the CSI as required for the CoMP schemes:

Firstly a new feedback mode (i.e., report mode) is designed so that all the information is arranged in the same mode to be reported, that is, a report periodicity and a sub-frame offset are configured uniformly, and all the information is reported sequentially to a base station in some order. This solution is advantageous in the easy introduction of the interdependency between the various reported information but inflexible in that the feedback mode may be changed due to any of a change to the number of transmission points in the measurement set, a change to the feedback information and a change to the preset interdependency, that is, the feedback mode thereof has to be designed taking the various possible situations into account.

Secondly the information to be reported is distributed into multiple feedback modes, each of which is configured separately with a report periodicity, a sub-frame offset and other parameters. A problem of this solution lies in that is not easy to introduce the interdependency between the reported information, particularly when the interdependent information is distributed into the different report modes.

SUMMARY

Embodiments of the invention provide a feedback method of and apparatus and system for coordinated multi-point transmission for the purpose of the interdependency between multiple feedback processes.

An embodiment of the invention provides a feedback method of coordinated multi-point transmission, the method including:

determining a process reference relationship between at least two configured processes from configuration information transmitted by a base station;

determining parameters in the current process from parameters in the reference process for each feedback according to the process reference relationship; and feeding back channel state information including the parameters in the current process according to the configuration of the current process.

An embodiment of the invention provides a feedback method of coordinated multi-point transmission, the method including:

transmitting configuration information to a user equipment, the configuration information includes a process reference relationship between at least two configured processes;

receiving channel state information, fed back by the user equipment for each feedback according to the configuration of the current process, including parameters in the current process, or channel state information including the parameters in the current process and parameters in a reference process of the current process; and determining the channel state information from the parameters fed back in the current process or from the parameters fed back in the current process and the parameters fed back in the reference process of the current process.

An embodiment of the invention provides a feedback apparatus for coordinated multi-point transmission, the apparatus including:

a reference relationship determining component configured to determine, a process reference relationship between at least two configured processes, from configuration information transmitted by a base station;

a parameter determining component configured to determine parameters in the current process from parameters in the reference process for each feedback according to the process reference relationship; and a feedback component configured to feed back channel state information including the parameters in the current process according to the configuration of the current process.

An embodiment of the invention provides a periodical feedback apparatus for coordinated multi-point transmission, the apparatus including:

a configuring component configured to transmit configuration information to a user equipment, the configuration information includes a process reference relationship between at least two configured processes;

a receiving component configured to receive channel state information, fed back by the user equipment for each feedback according to the configuration of the current process, including parameters in the current process, or channel state information including the parameters in the current process and parameters in a reference process of the current process; and a determining component configured to determine the channel state information from the parameters fed back in the current process or from the parameters fed back in the current process and the parameters fed back in the reference process of the current process.

An embodiment of the invention provides a feedback system for coordinated multi-point transmission, the system including a base station and a user equipment, wherein:

the user equipment is configured to determine, a process reference relationship between at least two configured processes, from configuration information transmitted by the Base station; to determine parameters in the current process from parameters in the reference process for each feedback according to the process reference relationship; and to feed back channel state information including the parameters in the current process according to the configuration of the current process; and the base station is configured to transmit the configuration information to the user equipment, wherein the configuration information includes the process reference relationship between the at least two configured processes; to receive the channel state information including the parameters in the current process, or the channel state information including the parameters in the current process and the parameters in the reference process of the current process, fed back by the user equipment for each feedback according to the configuration of the current process; and to determine the channel state information from the parameters fed back in the current process or from the parameters fed back in the current process and the parameters fed back in the reference process of the current process.

The embodiments of the invention provide a feedback method of and apparatus and system for coordinated multi-point transmission, a process reference relationship between at least two configured processes is determined from configuration information transmitted by a base station, and parameters in the current process are determined from parameters in the reference process according to the process reference relationship, so that PMI/RI information can be shared between CQI under multiple different interference assumptions, the RI information can be shared between different transmission points, and the interdependency between the multiple feedback processes can be available.

DETAILED DESCRIPTION

Embodiments of the invention provide a feedback method of and apparatus and system for coordinated multi-point transmission, where a process reference relationship between at least two configured processes is determined from configuration information transmitted by a base station, and parameters in the current process are determined from parameters in the reference process according to the process reference relationship, so that PMI/RI information can be shared between CQI under multiple different interference assumptions, the RI information can be shared between different transmission points, and the interdependency between the multiple feedback processes can be available.

Figure 1:
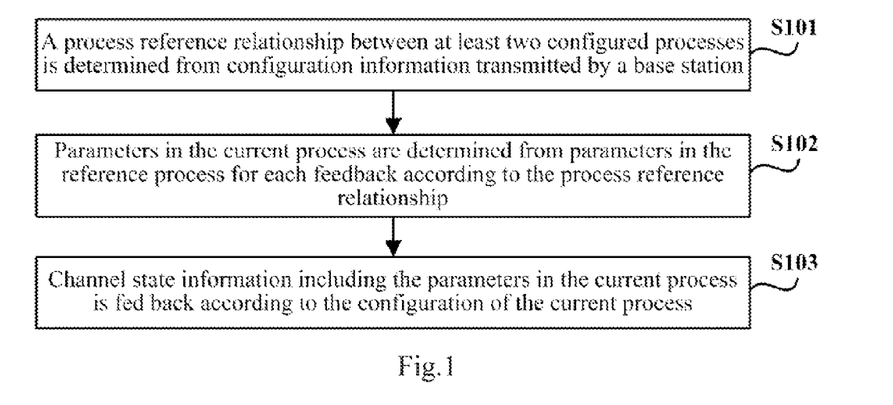
FIG. 1 is a first flow chart of a feedback method of coordinated multi-point transmission according to an embodiment of the invention.

As illustrated in FIG. 1, a feedback method of coordinated multi-point transmission according to an embodiment of the invention includes the following operations:

In the operation S101, a process reference relationship between at least two configured processes is determined from configuration information transmitted by a base station;

In the operation S102, parameters in the current process are determined from parameters in the reference process for each feedback according to the process reference relationship; and In the operation S103, channel state information including the parameters in the current process is fed back according to the configuration of the current process.

In the embodiment of the invention, the so-called "process" refers to a "report process", and the "report process" refers to a "feedback process".

Configuration information of each of the at least two processes configured by the Base station particularly includes one or combination of:

PUCCH resource information, CQI/PMI/RI sub-frame configuration information, a CQI/PMI report format, a CSI-RS resource indicator and an interference measurement resource indicator; and When the channel state information needs to be fed back for one of the configured processes with reference to other processes, the configuration information of the one process further includes:

Configuration information of a PMI reference process and/or an RI reference process.

In order to facilitate configuring the PMI reference process and/or the RI reference process, a process index of each of the processes can be set in the configuration information; and at this time the configuration information of the PMI reference process and/or the RI reference process can be a process index number of a process to be referenced or a bitmap in which the location corresponding to a process index of a process to be referenced is marked.

Configuration information of each of the at least two processes configured by the base station includes one or combination of:

The PUCCH resource information indicating those PUCCH resources over which the UE makes a report;

The CQI/PMI/RI sub-frame configuration information indicating those sub-frames in which the UE makes a report, e.g., a report periodicity and a sub-frame offset;

The CQI/PMI report format indicating that the UE reports a broadband or sub-band CQI/PMI;

The CSI-RS resource indicator indicating a CSI-RS resource, which can be one CSI-RS resource or multiple CSI-RS resources, over which the UE measures a signal;

The interference measurement resource indicator indicating those resources over which the UE measures interference;

A process index indicating the index of the currently configured process, each of report processes configured for a UE is provided with a unique index, and typically the index can range from 0 to N−1, where N represents the largest number of report processes allowed to be configured;

A list of PMI reference processes indicating the report process in which the PMI, from which the CQI reported in the current process is calculated, is reported, the report process can be indicated in the form of a bitmap with the length of N, for example, if the k-th bit (numbered starting from 0) in the bitmap is set to 1, then this indicates that the UE calculates the CQI from the PMI recently reported in the report process with the report process index k; or the reference report process can be indicated by the index thereof, that is, this indicates directly that the UE calculates the CQI from the PMI recently reported in the report process with the index k; and the PMI reference process can be the current process, and if the PMI reference process is not configured, then the current process is defaulted as the PMI reference process; and The RI reference process indicating the reference process in which the RI, from which the PMI/CQI reported in the current process is calculated, is reported, for example, if the RI reference process is k, then the UE needs to calculate the PMI and the CQI from the RI recently reported in the report process with a process index k; and the RI reference process can be the current process, and if the RI reference process is not configured, then the current process is defaulted as the RI reference process; and if the process has the PMI reported or is configured with the PMI reference process, then the CQI is calculated from the PMI recently reported in the process or the PMI recently reported in the reference process thereof (the CQI can be calculated from the RI implicitly determined from the PMI, that is, the CQI can be calculated from the same RI as the RI from which the PMI is calculated, and the UE can ignore the setting of the RI reference process or the RI reference process may not be configured).

In the operation S102, the UE determines the parameters in the current process from the parameters in the reference parameters according to the process reference relationship particularly as follows:

When the configuration information includes the configuration information of the RI reference process, and the RI reference process is not the current process, and the RI needs to be reported in the sub-frame in which the RI is reported, the RI to be reported in the current process is determined to be equal to the RI recently reported in the RI reference process and reports the RI in the current process;

When the configuration information includes the configuration information of the RI reference process, and the RI reference process is not the current process and the PMI needs to be reported in the sub-frame in which the PMI is reported, the PMI to be reported can be determined conditioned on the RI recently reported in the RI reference process;

When the configuration information includes the configuration information of the RI reference process, and the RI reference process is not the current process and the PMI needs to be reported in the sub-frame in which the PMI is reported, if the configuration information does not include the PMI reference process or the PMI reference process is the current process, then the PMI to be reported in the current process can be further determined from the RI recently reported in the RI reference process, interference estimated on the interference measurement resource and the channel state information estimated on the CSI-RS resource corresponding to the current process;

When the configuration information includes the configuration information of the RI reference process, and the RI reference process is not the current process and the CQI needs to be reported in the sub-frame in which the CQI is reported, then the CQI to be reported can be determined from the RI recently reported in the RI reference process;

When the configuration information includes the configuration information of the RI reference process, and the RI reference process is not the current process and the CQI needs to be reported in the sub-frame in which the CQI is reported, the CQI to be reported in the current process can be further determined from the RI recently reported in the current process, interference estimated on the interference measurement resource and the channel state information estimated on the CSI-RS resource corresponding to the current process; and When the configuration information includes the configuration information of the RI reference process, and the RI reference process is not the current process and the CQI needs to be reported in the sub-frame in which the CQI is reported, the CQI to be reported in the current process can be further determined from the RI recently reported in the RI reference process, the PMI recently reported in the current process, interference estimated on the interference measurement resource and the channel state information estimated on the CSI-RS resource corresponding to the current process.

When the configuration information includes the configuration information of the PMI reference process, the PMI reference process is not the current process and the PMI needs to be reported in the sub-frame in which the PMI is reported, the PMI is determined to be equal to the PMI recently reported in the PMI reference process; and When the configuration information includes the configuration information of the PMI reference process, the PMI reference process is not the current process and the CQI needs to be reported in the sub-frame in which the CQI is reported, the CQI to be reported is determined from a pre-coding matrix corresponding to the PMI recently reported in the PMI reference process.

Stated otherwise,

When the configuration information includes the configuration information of the RI reference process, and the RI reference process is not the current process, the RI is not reported in the current process, or the RI reported in the current process is equal to the RI recently reported in the RI reference process, and the PMI and the CQI are determined in the current process from the RI recently reported in the RI reference process;

When the configuration information includes the configuration information of the PMI reference process, and the PMI reference process is not the current process, the PMI is not reported in the current process, or the PMI reported in the current process is equal to the PMI recently reported in the PMI reference process, and the CQI is determined in the current process from the PMI recently reported in the PMI reference process (the CQI can be calculated from the RI implicitly determined from the PMI, that is, the CQI can be calculated from the same RI as the RI from which the PMI is calculated); and When the configuration information does not include the RI reference process or the RI reference process is the current process, the RI to be reported in the current process is determined from the channel state information estimated on the CSI-RS resource corresponding to the current process and interference estimated on the interference measurement resource.

The PMI and the CQI are determined in the current process from the RI recently reported in the RI reference process particularly as follows:

When the configuration information does not include the PMI reference process or the PMI reference process is the current process, the PMI to be reported in the current process is determined from the RI recently reported in the RI reference process or the current process, interference estimated on the interference measurement resource and the channel state information estimated on the CSI-RS resource corresponding to the current process, and the CQI to be reported in the current process is determined from the PMI recently reported in the current process, interference estimated on the interference measurement resource and the channel state information estimated on the CSI-RS resource corresponding to the current process.

The CQI is determined in the current process from the PMI recently reported in the PMI reference process particularly as follows:

The CQI to be reported in the current process is determined from the PMI recently reported in the PMI reference process or the current process, interference estimated on the interference measurement resource and the channel state information estimated on the CSI-RS resource corresponding to the current process.

Particularly upon reception of the configuration information of one of the processes, the UE can determine the information to be reported in the process: if the configuration information of one of the processes includes the RI reference process, and the RI reference process is not the current process, then the RI is not reported in the current process or the RI reported in the current process is equal to the RI recently reported in the RI reference process; and the PMI and the CQI is calculated in the current process from the RI recently reported in the RI reference process; if the configuration information of one of the processes includes the list of PMI reference processes, the list of PMI reference processes does not include the current process, the PMI is not reported in the current process or the PMI reported in the current process is equal to the PMI recently reported in the PMI reference process; and the CQI is calculated in the current process from the PMI recently reported in a process in the list of reference processes.

The UE making a report needs to determine the parameters to be reported:

In the sub-frame in which the RI is to be reported, if the RI reference process is configured and the RI needs to be reported, then the RI thereof can be made equal to the RI recently reported in the RI reference process and reported, and if the RI reference process is not configured or the configured RI reference process is the current process, then the RI to be reported in the current process is determined from the channel state information estimated on the CSI-RS resource corresponding to the current process and interference estimated on the interference measurement resource.

In the sub-frame in which the PMI is to be reported, if the PMI reference process is not configured or the PMI reference process is the current process, the UE assumes that data is transmitted from a transmission point corresponding to the CSI-RS resource indicator corresponding to the current report (calculated over a channel estimated from the CSI-RS resource), and calculates the PMI to be reported from the RI recently reported in the RI reference process thereof (or the current process) and interference estimated over the interference measurement resource and reports the PMI. If the PMI reference process is configured and the PMI needs to be reported, then equals the PMI to the PMI recently reported in the PMI reference process and reports the PMI In the sub-frame in which the CQI is to be reported, it is assumed that data is transmitted from a transmission point corresponding to the CSI-RS resource indicator corresponding to the current report (calculated over a channel estimated from the CSI-RS resource), and calculates the CQI to be reported from interference estimated on the interference measurement resource thereof using a pre-coding matrix corresponding to the PMI recently reported in the PMI reference process thereof (or the current process) and reports the CQI. In the event that the current process has no PMI reported and is not configured with the PMI reference process (e.g., open-loop transmission), the CQI thereof needs to be calculated from the RI recently reported in the RI reference process thereof (or the current process).

"Recently reported" refers to being reported immediately before the moment of reporting, including being reported at the moment of reporting.

When reports are made in two of the processes in the same sub-frame, the report information in the two processes can be merged so that the merged report information is to be transmitted over the same PUCCH; or the priority of the report information in the two processes can be compared so that the report information at the lower priority is to be discarded and only the report information at the higher priority is to be reported.

The feedback method for coordinated multi-point transmission according to the embodiment of the invention will be described below in particular embodiments thereof.

First Embodiment

The base station configures the UE with two report processes, M1 and M2, corresponding to CSI-RS resources which are a CSI-RS1 and a CSI-RS2 respectively, that is, channel state information of two transmission points is reported respectively in the M1 and the M2.

The RI reference process of the M2 is the M1, that is, the PMI/CQI to be reported in the M2 is calculated from the RI recently reported in the M1, and the RI is not to be reported in the M2 process itself. The RI reference process of the M1 is the M1 itself (or the RI reference process is not configured, and at this time the RI reference process thereof is defaulted as the M1 itself), that is, the RI is to be reported in the M1.

The UE estimates the channel state information from the CSI-RSI and calculates from the interference measured over the interference measurement resource and reports the RI. Both the PMI reference processes of the M1 and the M2 are the M1 the M2 themselves (or none of the PMI reference processes is configured, and the PMI reference processes are defaulted as the M1 and the M2 themselves), and the UE calculates from the determined RI and the channel state information estimated from the CSI-RS1 and the CSI-RSI2 and reports the PMIs to be reported.

Figure 2:
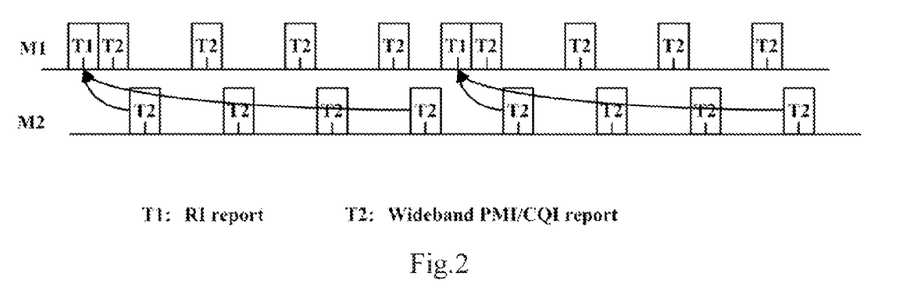
FIG. 2 and FIG. 3 are schematic diagrams of process interdependencies corresponding to a first embodiment according to embodiments of the invention.

As illustrated in FIG. 2, both the processes in FIG. 2 are configured with wideband CQI/PMI reports, where the arrows in FIG. 2 represent the dependency relationship between the report information, and the boxes in FIG. 2 represent the sub-frames in which the information is reported.

Figure 3:
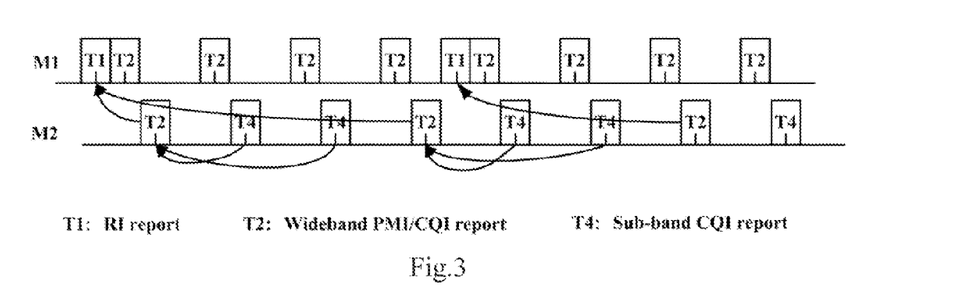

As illustrated in FIG. 3, the M1 is configured with a wideband CQI/PMI report, and the M2 is configured with a sub-band CQI report, that is, the report information in the M2 includes a wideband PMI/CQI and a sub-band CQI, where the wideband PMI is calculated from the RI recently reported in the M1, the wideband CQI is calculated from the PMI recently reported in the M2 in the same sub-frame, and the sub-band CQI is calculated from the wideband PMI recently reported in the process M2 (the RI can be implicitly determined from the wideband PMI).

Second Embodiment

The base station configures the UE with two feedback processes, M1 and M2 corresponding to CSI-RS resources, both of which are a CSI-RS1, and to interference measurement resources which are an Interference Measurement Resource (IMR1) and an IMR2 respectively, that is, channel state information of the same transmission point in two different interference states is reported respectively in the M1 and the M2.

The PMI reference process of the M2 is the M1, that is, the CQI reported in the M2 is calculated from the PMI recently reported in the M1 (which can be defined a wideband PMI), and the PMI is not reported in the M2 process. The PMI reference process of the M1 is the M1 itself (or the PMI reference process is not configured, and at this time the PMI reference process thereof is the M1 itself), that is, the PMI is reported in the M1, and the UE estimates the channel state information from the CSI-RS1 and calculates from the channel state information and the interference measured over the interference measurement resource IMR1 and reports the PMI.

At this time the RI reference process of the M2 shall be configured as the M1 or the M2 is not configured with the RI reference process, and the UE calculates the CQI conditioned the RI determined from the PMI recently reported in the M1 (the reported PMI is dependent upon the RI, so the RI can be implicitly known from the determined PMI).

Figure 4:
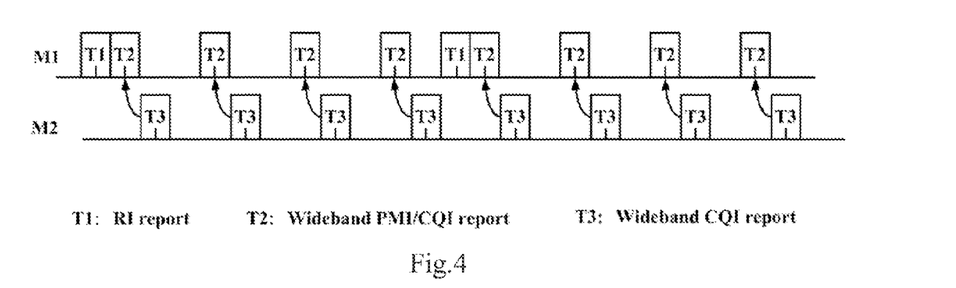
FIG. 4 and FIG. 5 are schematic diagrams of process interdependencies corresponding to a second embodiment according to embodiments of the invention.

As illustrated in FIG. 4, both the processes are configured with wideband CQI/PMI reports, where the arrows in FIG. 4 represent the interdependencies between the report information, and the boxes in FIG. 4 represent the sub-frames in which the information is reported.

Figure 5:
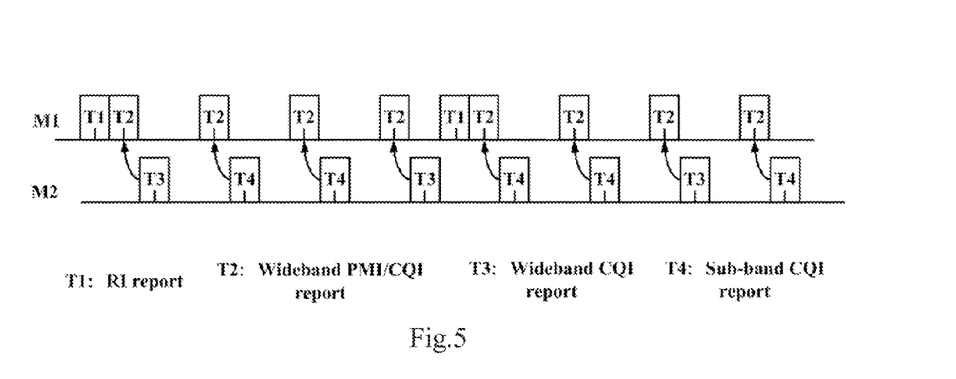

As illustrated in FIG. 5, the M5 is configured with a wideband CQI/PMI report, and the M2 is configured with a sub-band CQI report, where the report information in the M2 includes a wideband CQI and a sub-band CQI, where the wideband CQI or the sub-band CQI is calculated from the PMI recently reported in the M1.

Third Embodiment

The base station configures the UE with three report processes, M1, M2 and M3. The M1 is configured with a CSI-RS resource which is a CSI-RS1 and an interference measurement resource which is an IMR1, and the M2 and the M3 are configured with CSI-RS resources, both of which are a CSI-RS2, and interference measurement resources which are an IMR2 and an IMR3 respectively, that is, channel state information of the same transmission point in two different interference states is reported respectively in the M2 and the M3, and channel state information of the other transmission point is reported in the M1.

Figure 6:
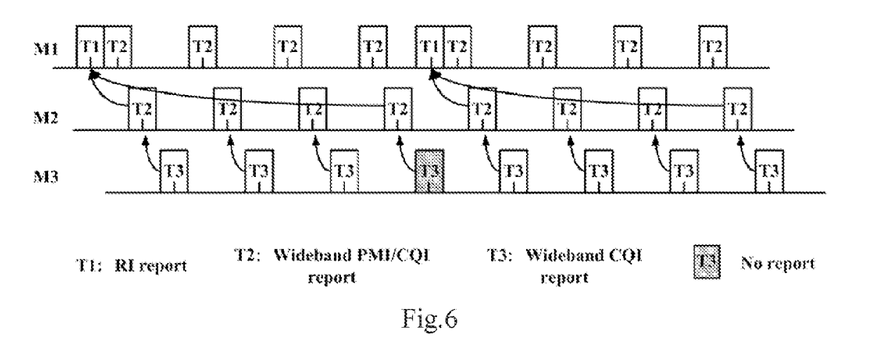
FIG. 6 is a schematic diagram of a process interdependency corresponding to a third embodiment according to an embodiment of the invention.

As illustrated in FIG. 6, the RI reference process of the M1 is the M1 itself (or the RI reference process is not configured, and at this time the RI reference process thereof is defaulted as the M1 itself), that is, the RI is reported in the M1, and the UE estimates the channel state information from the CSI-RS1 and calculates from the channel state information and the interference measured over the interference measurement resource IMR1 and reports the RI.

The PMI reference process of the M1 is the M1 itself (or the PMI reference process is not configured, and at this time the PMI reference process is defaulted as the M1 itself), that is, the PMI is reported in the M1, and the UE estimates the channel state information from the CSI-RS1 and calculates from the channel state information, the interference measured over the interference measurement resource IMR1 and the recently reported RI and reports the PMI.

The RI reference process of the M2 is the M1, and the PMI reference process of the M2 is the M2 itself, that is, the PMI reported in the M2 is calculated from the RI recently reported in the M1, and the RI is not reported in the M2 process.

The PMI reference process of the M3 is the M2, that is, the CQI reported in the M3 is calculated from the PMI recently reported in the M2 (which can be defined as a wideband PMI), and the PMI is not reported in the M3 process itself. The M3 is not configured with the RI reference process, and the UE calculates the CQI from the RI determined from the PMI recently reported in the M2 (the reported PMI is dependent upon the RI, so the RI can be implicitly known from the determined PMI).

In this embodiment, some of the report information in the M3 and the M1 may be configured in the same sub-frame, and at this time this can be done in the following two implementations: firstly the report information of the two processes is merged and transmitted over the same PUCCH; and secondly the report information at a lower priority is discarded and only the report information at a higher priority is reported in a order of priority. In FIG. 6, the priority of the RI is higher than that of the CQI, so the report in the T3 is discarded.

Fifth Embodiment

The base station configures the UE with three report processes, M1, M2 and M3. The M1 is configured with a CSI-RS resource which is a CSI-RS1 and an interference measurement resource which is an IMR1, the M2 is configured with a CSI-RS resource which is a CSI-RS2 and an interference measurement resource which is an IMR2, that is, channel state information of two transmission points is reported respectively in the M1 and the M2. The M3 is configured with CSI-RS resources which is the CSI-RS1 and the CSI-RS2 and an interference measurement resource which is an IMR3, that is, CQI of the two transmission points jointly transmitting is reported in the M3.

Figure 7:
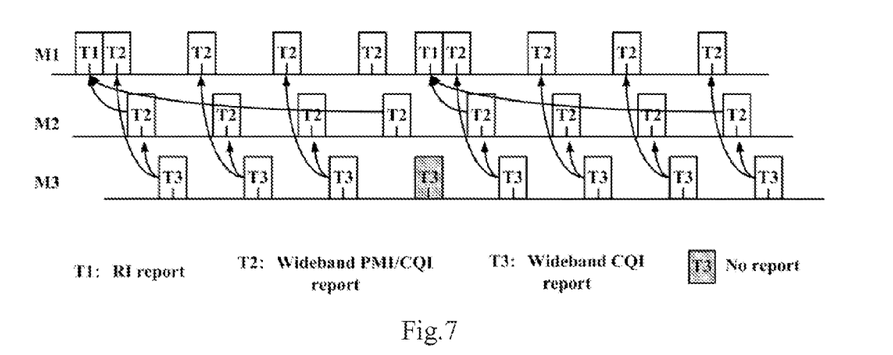
FIG. 7 is a schematic diagram of a process interdependency corresponding to a fourth embodiment according to an embodiment of the invention.

As illustrated in FIG. 7, the RI reference process of the M1 is the M1 itself, that is, the RI is reported in the M1, and the UE estimates the channel state information from the CSI-RS1 and calculates from the channel state information and the interference measured over the interference measurement resource IMR1 and reports the RI. The PMI reference process of the M1 is the M1 itself, that is, the PMI is reported in the M1, and the UE estimates the channel state information from the CSI-RS1 and calculates from the channel state information, the interference measured over the interference measurement resource IMR1 and the recently reported RI and reports the PMI.

The RI reference process of the M2 is the M1, and the PMI reference process of the M2 is the M2 itself, that is, the PMI reported in the M2 is calculated from the RI recently reported in the M1, and the RI is not reported in the M2 process.

The PMI reference processes of the M3 include the M1 and the M2, that is, the CQI reported in the M3 is calculated from the PMIs recently reported respectively in the M1 and the M2 (which can be defined as wideband PMIs), and the PMI is not reported in the M3 process itself.

In FIG. 7, the priority of the RI is higher than that of the CQI, so the report in the T3 is discarded when the report information in the M3 and the M1 is configured in the same sub-frame.

Figure 8:
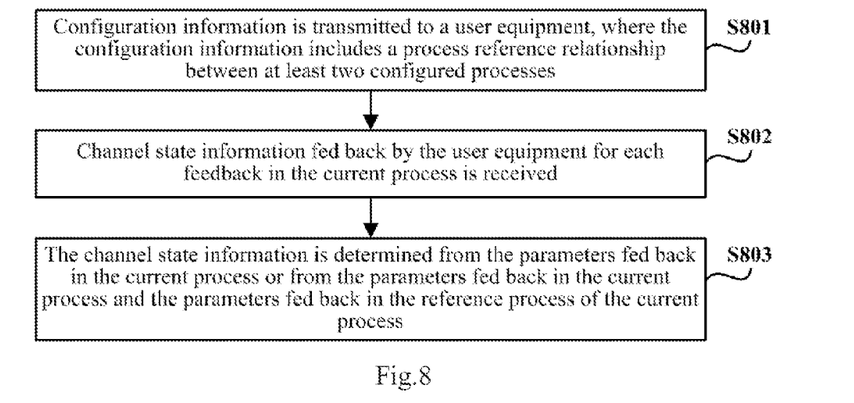
FIG. 8 is a second flow chart of a feedback method of coordinated multi-point transmission according to an embodiment of the invention.

An embodiment of the invention further correspondingly provides a feedback method for coordinated multi-point transmission, and as illustrated in FIG. 8, the method includes the following operations:

In the operation S801, configuration information is transmitted to a user equipment, where the configuration information includes a process reference relationship between at least two configured processes;

In the operation S802, channel state information, fed back by the user equipment for each feedback according to the configuration of the current process is received, including parameters in the current process, or channel state information including the parameters in the current process and parameters in a reference process of the current process; and In the operation S803, the channel state information is determined from the parameters fed back in the current process or from the parameters fed back in the current process and the parameters fed back in the reference process of the current process.

Among the configuration information transmitted to the user equipment, configuration information of each of the processes particularly includes one or combination of:

PUCCH resource information, CQI/PMI/RI sub-frame configuration information, a CQI/PMI report format, a CSI-RS resource indicator and an interference measurement resource indicator; and When the channel state information needs to be fed back for one of the configured processes with reference to other processes, the configuration information of the one process further includes:

Configuration information of a PMI reference process and/or an RI reference process.

In order to facilitate configuring the PMI reference process and/or the RI reference process, the configuration information further includes a process index; and The configuration information of the PMI reference process and/or the RI reference process particularly includes:

A process index number of a process to be referenced; or

A bitmap in which the location corresponding to a process index of a process to be referenced is marked.

In the operation S803, the channel state information is determined from the parameters fed back in the current process and the parameters fed back in the reference process of the current process particularly as follows:

When the configuration information of the current process includes the RI reference process and the reference process is not the current process, it is determined that the PMI and the CQI reported in the current process are determined from the RI recently reported in the RI reference process; when the PMI is reported in the current process, it is determined that the channel state information includes the PMI and the CQI reported in the current process and the RI recently reported in the RI reference process; when the CQI is reported in the current process and the CQI reported in the current process is determined from the RI recently reported in the RI reference process, it is determined that the channel state information includes the CQI reported in the current process and the RI recently reported in the RI reference process; and when the CQI is reported in the current process and the CQI reported in the current process is determined from the RI recently determined in the RI reference process and the PMI recently reported in the current process, it is determined that the channel state information includes the CQI reported in the current process, the PMI recently reported in the current process and the RI recently reported in the RI reference process; and When the configuration information of the current process includes the configuration information of the PMI reference process and the reference process is not the current process, it is determined that the CQI reported in the current process is determined from the PMI recently reported in the PMI reference process, and it is determined that the channel state information includes the CQI reported in the current process and the PMI recently reported in the PMI reference process.

Particularly the PMI and the CQI reported in the current process are determined from the RI recently reported in the RI reference process particularly as follows:

When the configuration information of the current process does not include the PMI reference process or the reference process is the current process, the PMI reported in the current process is determined from the RI recently reported in the RI reference process or the current process, interference estimated on the interference measurement resource and the channel state information estimated on the CSI-RS resource corresponding to the current process, and the CQI reported in the current process is determined by the user equipment from the PMI recently reported in the current process, interference estimated on the interference measurement resource and the channel state information estimated on the CSI-RS resource corresponding to the current process.

The CQI reported in the current process is determined from the PMI recently reported in the PMI reference process particularly as follows:

The CQI reported in the current process is determined from the PMI recently reported in the PMI reference process or the current process, interference estimated on the interference measurement resource and the channel state information estimated on the CSI-RS resource corresponding to the current process.

When reports are made in two of the processes in the same sub-frame, the user equipment can merge the report information in the two processes and transmit the merged report information over the same PUCCH; or the user equipment can compare the priority of the report information in the two processes and discard the report information at the lower priority and report only the report information at the higher priority, and at this time a base station receives the report information as a result of merging the report information in the multiple process over the same PUCCH; or receives in the sub-frame the report information at the higher priority reported by the user equipment after comparing the priority of the report information in the two processes and discarding the report information at the lower priority.

Figure 9:
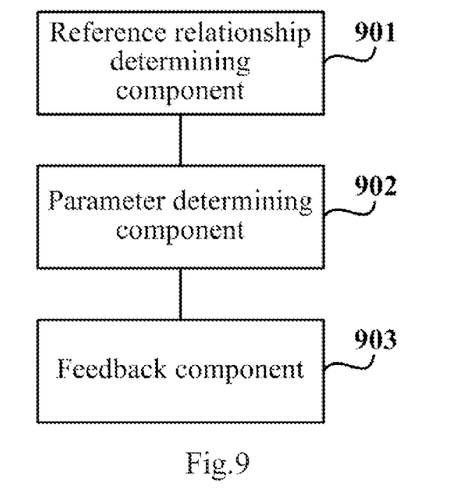
FIG. 9 is a first schematic structural diagram of a feedback apparatus for coordinated multi-point transmission according to an embodiment of the invention.

Correspondingly an embodiment of the invention further provides a feedback apparatus for coordinated multi-point transmission, where the apparatus can be particularly a user equipment, and as illustrated in FIG. 9, the apparatus includes:

A reference relationship determining component 901 is configured to determine, a process reference relationship between at least two configured processes, from configuration information transmitted by a base station;

A parameter determining component 902 is configured to determine parameters in the current process from parameters in the reference process for each feedback according to the process reference relationship; and A feedback component 903 is configured to feed back channel state information including the parameters in the current process according to the configuration of the current process.

Particularly configuration information of each of the at least two processes configured by the Base station particularly includes one or combination of:

PUCCH resource information, CQI/PMI/RI sub-frame configuration information, a CQI/PMI report format, a CSI-RS resource indicator and an interference measurement resource indicator; and When the channel state information needs to be fed back for one of the configured processes with reference to other processes, the configuration information of the one process further includes:

Configuration information of a PMI reference process and/or an RI reference process.

In order to configure the PMI reference process and/or the RI reference process, the configuration information further includes a process index; and At this time the configuration information of the PMI reference process and/or the RI reference process is particularly:

A process index number of a process to be referenced; or

A bitmap in which the location corresponding to a process index of a process to be referenced is marked.

The parameter determining component 902 is particularly configured:

When the configuration information includes the configuration information of the RI reference process, the RI reference process is not the current process and the RI needs to be reported in the sub-frame in which the RI is reported, to determine the RI reported in the current process to be equal to the RI recently reported in the RI reference process and to report the RI to be reported in the current process.

The parameter determining component 902 is particularly configured:

When the configuration information includes the configuration information of the RI reference process, the RI reference process is not the current process and the PMI needs to be reported in the sub-frame in which the PMI is reported, to determine the PMI to be reported conditioned on the RI recently reported in the RI reference process.

The parameter determining component 902 configured to determine the PMI to be reported from the RI recently reported in the RI reference process is particularly configured:

When the configuration information does not include the PMI reference process or the PMI reference process is the current process, to determine the PMI to be reported in the current process from the RI recently reported in the RI reference process, interference estimated on the interference measurement resource and the channel state information estimated on the CSI-RS resource corresponding to the current process.

The parameter determining component 902 is particularly configured:

When the configuration information includes the configuration information of the RI reference process, the RI reference process is not the current process and the CQI needs to be reported in the sub-frame in which the CQI is reported, to determine the CQI to be reported from the RI recently reported in the RI reference process.

The parameter determining component 902 configured to determine the CQI to be reported from the RI recently reported in the RI reference process is particularly configured:

To determine the CQI to be reported in the current process from the RI recently reported in the current process, interference estimated on the interference measurement resource and the channel state information estimated on the CSI-RS resource corresponding to the current process; or To determine the CQI to be reported in the current process from the RI recently reported in the RI reference process, the PMI recently reported in the current process, interference estimated on the interference measurement resource and the channel state information estimated on the CSI-RS resource corresponding to the current process.

The parameter determining component 902 is particularly configured:

When the configuration information includes the configuration information of the PMI reference process, the PMI reference process is not the current process and the PMI needs to be reported in the sub-frame in which the PMI is reported, to determine the PMI to be equal to the PMI recently reported in the PMI reference process.

The parameter determining component 902 is particularly configured:

When the configuration information includes the configuration information of the PMI reference process, the PMI reference process is not the current process and the CQI needs to be reported in the sub-frame in which the CQI is reported, to determine the CQI to be reported from a pre-coding matrix corresponding to the PMI recently reported in the PMI reference process.

The parameter determining component 902 is particularly configured:

When the configuration information includes the configuration information of the RI reference process, the RI reference process is not the current process, to determine that the RI is not reported in the current process or the RI to be reported in the current process is equal to the RI recently reported in the RI reference process, and to determine the PMI and the CQI in the current process from the RI recently reported in the RI reference process;

When the configuration information includes the configuration information of the PMI reference process, the PMI reference process is not the current process, to determine that the PMI is not to be reported in the current process or the PMI reported in the current process is equal to the PMI recently reported in the PMI reference process, and to determine the CQI in the current process from the PMI recently reported in the PMI reference process; and When the configuration information does not include the RI reference process or the RI reference process is the current process, to determine the RI to be reported in the current process from the channel state information estimated on the CSI-RS resource corresponding to the current process and interference estimated on the interference measurement resource.

The parameter determining component 902 configured to determine the PMI and the CQI in the current process from the RI recently reported in the RI reference process is particularly configured:

When the configuration information does not include the PMI reference process or the PMI reference process is the current process, to determine the PMI to be reported in the current process from the RI recently reported in the RI reference process or the current process, interference estimated on the interference measurement resource and the channel state information estimated on the CSI-RS resource corresponding to the current process, and to determine the CQI to be reported in the current process from the PMI recently reported in the current process, interference estimated on the interference measurement resource and the channel state information estimated on the CSI-RS resource corresponding to the current process.

The parameter determining component 902 configured to determine the CQI in the current process from the PMI recently reported in the PMI reference process is particularly configured:

To determine the CQI to be reported in the current process from the PMI recently reported in the PMI reference process or the current process, interference estimated on the interference measurement resource and the channel state information estimated on the CSI-RS resource corresponding to the current process.

The feedback component 903 is further configured, when reports are made in two of the processes in the same sub-frame, to merge the report information in the two processes and to transmit the merged report information over the same PUCCH; or to compare the prioritiy of the report information in the two processes and to discard the report information at the lower priority and only report the report information at the higher priority.

Figure 10:
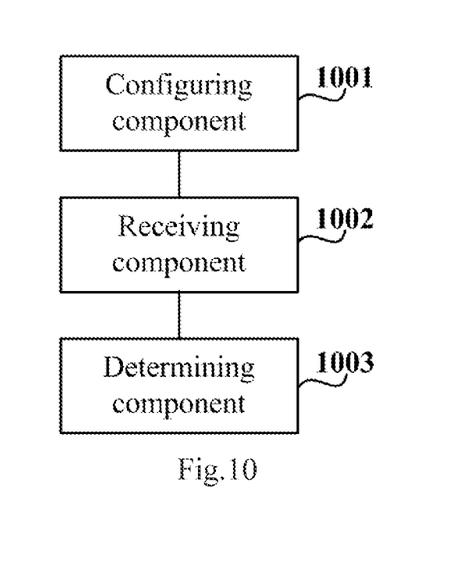
FIG. 10 is a second schematic structural diagram of a feedback apparatus for coordinated multi-point transmission according to an embodiment of the invention.

An embodiment of the invention further correspondingly provides a feedback apparatus for coordinated multi-point transmission, where the apparatus can be particularly a base station, and as illustrated in FIG. 10, the apparatus includes:

A configuring component 1001 is configured to transmit configuration information to a user equipment, where the configuration information includes a process reference relationship between at least two configured processes;

A receiving component 1002 is configured to receive channel state information, fed back by the user equipment for each feedback according to the configuration of the current process, including parameters in the current process, or channel state information including the parameters in the current process and parameters in a reference process of the current process; and A determining component 1003 is configured to determine the channel state information from the parameters fed back in the current process or from the parameters fed back in the current process and the parameters fed back in the reference process of the current process.

Particularly among the configuration information transmitted to the user equipment, configuration information of each of the processes particularly includes one or combination of:

PUCCH resource information, CQUPMURI sub-frame configuration information, a CQI/PMI report format, a CSI-RS resource indicator and an interference measurement resource indicator; and When the channel state information needs to be fed back for one of the configured processes with reference to other processes, the configuration information of the one process further includes:

Configuration information of a PMI reference process and/or an RI reference process.

In order to configure the PMI reference process and/or the RI reference process, the configuration information further includes a process index; and The configuration information of the PMI reference process and/or the RI reference process particularly includes:

A process index number of a process to be referenced; or

A bitmap in which the location corresponding to a process index of a process to be referenced is marked.

The determining component 1003 is particularly configured:

When the configuration information of the current process includes the configuration information of the RI reference process and the reference process is not the current process, to determine that the PMI and the CQI reported in the current process are determined from RI recently reported in the RI reference process; when the PMI is reported in the current process, to determine that the channel state information includes the PMI and the CQI reported in the current process and the RI recently reported in the RI reference process; when the CQI is reported in the current process and the CQI reported in the current process is determined from the RI recently reported in the RI reference process, to determine that the channel state information includes the CQI reported in the current process and the RI recently reported in the RI reference process; and when the CQI is reported in the current process and the CQI reported in the current process is determined from the RI recently determined in the RI reference process and the PMI recently reported in the current process, to determine that the channel state information includes the CQI reported in the current process, the PMI recently reported in the current process and the RI recently reported in the RI reference process; and When the configuration information of the current process includes the configuration information of the PMI reference process and the reference process is not the current process, to determine that the CQI reported in the current process is determined from the PMI recently reported in the PMI reference process, and to determine that the channel state information includes the CQI reported in the current process and the PMI recently reported in the PMI reference process.

When reports are made in more than one of the processes in the same sub-frame, the receiving component 1002 is further configured:

To receive report information as result of merging the report information in the more than one process over the same PUCCH; or To receive in the sub-frame the report information at the higher priority reported by the user equipment after comparing the priority of the report information in the two processes and discarding the report information at the lower priority.

Figure 11:
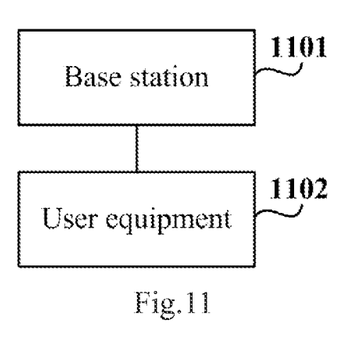
FIG. 11 is a schematic structural diagram of a feedback system for coordinated multi-point transmission according to an embodiment of the invention.

An embodiment of the invention further provides a feedback system for coordinated multi-point transmission, and as illustrated in FIG. 11, the system includes a Base station 1101 and a user equipment 1102, where:

The user equipment 1102 is configured to determine, a process reference relationship between at least two configured processes, from configuration information transmitted by the base station 1101; to determine parameters in the current process from parameters in the reference process for each feedback according to the process reference relationship; and to feed back channel state information including the parameters in the current process according to the configuration of the current process; and The base station 1101 is configured to transmit the configuration information to the user equipment 1102, where the configuration information includes the process reference relationship between the at least two configured processes; to receive the channel state information including the parameters in the current process, or the channel state information including the parameters in the current process and the parameters in the reference process of the current process, fed back by the user equipment for each feedback according to the configuration of the current process; and to determine the channel state information from the parameters fed back in the current process or from the parameters fed back in the current process and the parameters fed back in the reference process of the current process.

The embodiments of the invention provide a feedback method of and apparatus and system for coordinated multipoint transmission, where a process reference relationship between at least two configured processes is determined from configuration information transmitted by a base station, and parameters in the current process are determined from parameters in the reference process according to the process reference relationship, so that PMI/RI information can be shared between CQI under multiple different interference assumptions, the RI information can be shared between different transmission points, and the interdependency between the multiple feedback processes can be available.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A feedback method of coordinated multi-point transmission, comprising:
   determining a process reference relationship between at least two configured processes from configuration information transmitted by a base station;
   determining parameters in a current process from parameters in a reference process for each feedback according to the process reference relationship; and
   feeding back channel state information comprising the parameters in the current process according to a configuration of the current process.

2. The method of claim 1, wherein configuration information of each of the at least two processes configured by the base station comprises one or combination of:
   Physical Uplink Control Channel (PUCCH) resource information, Channel Quality Indicator (CQI)/Pre-coding Matrix Indicator (PMI)/Rank Indictor (RI) sub-frame configuration information, a CQI/PMI report format, a Channel State Information-Reference signal (CSI-RS) resource indicator and an interference measurement resource indicator; and
   when the channel state information needs to be fed back for one of the configured processes with reference to other processes, configuration information of the one of the configured processes further comprises:
   configuration information of a PMI reference process and/or an RI reference process.

3. The method of claim 2, wherein the configuration information further comprises a process index; and the configuration information of the PMI reference process and/or the RI reference process comprises:
   a process index number of a process to be referenced; or
   a bitmap in which a location corresponding to a process index of a process to be referenced is marked.

4. The method of claim 2, wherein the determining the parameters in the current process from the parameters in the reference process according to the process reference relationship comprises:
   when the configuration information comprises the configuration information of the RI reference process, the RI reference process is not the current process, and a RI needs to be reported in a sub-frame in which a RI is reported, determining the RI to be reported in the current process to be equal to a RI recently reported in the RI reference process and reporting the RI to be reported in the current process.

5. The method of claim 3, wherein the determining the parameters in the current process from the parameters in the reference process according to the process reference relationship comprises:
   when the configuration information comprises the configuration information of the RI reference process, the RI reference process is not the current process, determining that a RI is not to be reported in the current process or the RI to be reported in the current process is equal to a RI recently reported in the RI reference process, and determining a PMI and a CQI in the current process from the RI recently reported in the RI reference process; and
   when the configuration information comprises the configuration information of the PMI reference process, the PMI reference process is not the current process, determining that the PMI is not to be reported in the current process or the PMI to be reported in the current process is equal to a PMI recently reported in the PMI reference process, and determining the CQI in the current process from the PMI recently reported in the PMI reference process;
   wherein the determining a PMI and a CQI in the current process conditioned on the RI recently reported in the RI reference process comprises:
   when the configuration information does not comprise the configuration information of the PMI reference process or the PMI reference process is the current process, determining the PMI to be reported in the current process conditioned on the RI recently reported in the RI reference process or a RI recently reported in the current process, interference estimated over an interference measurement resource and channel state information estimated over a CSI-RS resource corresponding to the current process, and determining a CQI to be reported in the current process conditioned on a PMI recently reported in the current process, interference estimated over the interference measurement resource and the channel state information estimated over the CSI-RS resource corresponding to the current process.

6. The method of claim 2, wherein the determining the parameters in the current process from the parameters in the reference process according to the process reference relationship comprises:
   when the configuration information comprises the configuration information of the RI reference process, the RI reference process is not the current process and a PMI needs to be reported in a sub-frame in which a PMI is reported, determining the PMI to be reported conditioned on a RI recently reported in the RI reference process.

7. The method of claim 2, wherein the determining the parameters in the current process from the parameters in the reference process according to the process reference relationship comprises:
  when the configuration information comprises the configuration information of the RI reference process, the RI reference process is not the current process, and a CQI needs to be reported in the sub-frame in which a CQI is reported, determining the CQI to be reported from a RI recently reported in the RI reference process;
  when the configuration information comprises the PMI reference process, the PMI reference process is not the current process and a PMI needs to be reported in a sub-frame in which a PMI is reported, determining a value of the PMI to be reported to be equal to a value of a PMI recently reported in the PMI reference process; and
  when the configuration information comprises the PMI reference process, the PMI reference process is not the current process, and a CQI needs to be reported in the sub-frame in which a CQI is reported, determining the CQI to be reported conditioned on a pre-coding matrix corresponding to a PMI recently reported in the PMI reference process.

8. A feedback method of coordinated multi-point transmission, comprising:
  transmitting configuration information to a user equipment, the configuration information comprises a process reference relationship between at least two configured processes;
  receiving channel state information, fed back by the user equipment for each feedback according to configuration of a current process, comprising parameters in a current process, or comprising the parameters in the current process and parameters in a reference process of the current process; and
  determining the channel state information from the parameters fed back in the current process or from the parameters fed back in the current process and the parameters fed back in the reference process of the current process.

9. The method of claim 8, wherein among the configuration information transmitted to the user equipment, configuration information of each of the processes particularly comprises one or combination of:
  Physical Uplink Control Channel (PUCCH) resource information, Channel Quality Indicator (CQI)/Pre-coding Matrix Indicator (PMI)/Rank Indictor (RI) sub-frame configuration information, a CQI/PMI report format, a Channel State Information-Reference signal (CSI-RS) resource indicator and an interference measurement resource indicator; and
  when the channel state information needs to be fed back for one of the configured processes with reference to other processes, the configuration information of the one of the configured process further comprises:
  configuration information of a PMI reference process and/or an RI reference process.

10. The method of claim 9, wherein the configuration information further comprises a process index; and
  the configuration information of the PMI reference process and/or the RI reference process comprises:
  a process index number of a process to be referenced; or
  a bitmap in which a location corresponding to a process index of a process to be referenced is marked.

11. The method of claim 10, wherein the determining the channel state information from the parameters fed back in the current process or from the parameters fed back in the current process and the parameters fed back in the reference process of the current process comprises:
  when the configuration information of the current process comprises the configuration information of the RI reference process and the reference process is not the current process, determining that a PMI and a CQI reported in the current process are determined from the RI recently reported in the RI reference process; when the PMI is reported in the current process, determining that the channel state information comprises the PMI reported in the current process and the RI recently reported in the RI reference process; when the CQI is reported in the current process and the CQI reported in the current process is determined from the RI recently reported in the RI reference process, determining that the channel state information comprises the CQI reported in the current process and the RI recently reported in the RI reference process; and when the CQI is reported in the current process and the CQI reported in the current process is determined from the RI recently determined in the RI reference process and a PMI recently reported in the current process, determining that the channel state information comprises the CQI reported in the current process, the PMI recently reported in the current process and the RI recently reported in the RI reference process; and
  when the configuration information of the current process comprises the configuration information of the PMI reference process and the reference process is not the current process, determining that the CQI reported in the current process is determined from the PMI recently reported in the PMI reference process, and determining that the channel state information comprises the CQI reported in the current process and the PMI recently reported in the PMI reference process.

12. A feedback apparatus for coordinated multi-point transmission, comprising:
  a reference relationship determining component configured to determine, a process reference relationship between at least two configured processes, from configuration information transmitted by a base station;
  a parameter determining component configured to determine parameters in a current process from parameters in a reference process for each feedback according to the process reference relationship; and
  a feedback component configured to feed back channel state information comprising the parameters in the current process according to a configuration of the current process.

13. The apparatus of claim 12, wherein configuration information of each of the at least two processes configured by the base station comprises one or combination of:
  Physical Uplink Control Channel (PUCCH) resource information, Channel Quality Indicator (CQI)/Pre-coding Matrix Indicator (PMI)/Rank Indictor (RI) sub-frame configuration information, a CQI/PMI report format, a Channel State Information-Reference signal (CSI-RS) resource indicator and an interference measurement resource indicator; and
  when the channel state information needs to be fed back for one of the configured processes with reference to other processes, configuration information of the one of the configured processes further comprises:
  configuration information of a PMI reference process and/or an RI reference process.

14. The apparatus of claim 13, wherein the configuration information further comprise a process index; and the configuration information of the PMI reference process and/or the RI reference process comprises:
a process index number of a process to be referenced; or
a bitmap in which a location corresponding to a process index of a process to be referenced is marked.

15. The apparatus of claim 13, wherein the parameter determining component is configured:
when the configuration information comprises the configuration information of the RI reference process, the RI reference process is not the current process, and a RI needs to be reported in a sub-frame in which a RI is reported, to determine the RI reported in the current process to be equal to a RI recently reported in the RI reference process and to report the RI to be reported in the current process.

16. The apparatus of claim 13, wherein the parameter determining component is configured:
when the configuration information comprises the configuration information of the RI reference process, the RI reference process is not the current process and a PMI needs to be reported in a sub-frame in which a PMI is reported, to determine the PMI to be reported conditioned on a RI recently reported in the RI reference process.

17. The apparatus of claim 14, wherein the parameter determining component is configured:
when the configuration information comprises the configuration information of the RI reference process, the RI reference process is not the current process, to determine that a RI is not to be reported in the current process or the RI to be reported in the current process is equal to a RI recently reported in the RI reference process, and to determine a PMI and a CQI in the current process from the RI recently reported in the RI reference process;
when the configuration information comprises the configuration information of the PMI reference process, the PMI reference process is not the current process, to determine that the PMI is not to be reported in the current process or the PMI to be reported in the current process is equal to a PMI recently reported in the PMI reference process, and to determine the CQI in the current process from the PMI recently reported in the PMI reference process; and
when the configuration information does not comprise the configuration information of the RI reference process or the RI reference process is the current process, to determine the RI to be reported in the current process from channel state information estimated on a CSI-RS resource corresponding to the current process and interference estimated on an interference measurement resource.

* * * * *